US007143150B1

(12) United States Patent
Nuggehalli (10) Patent No.: US 7,143,150 B1
(45) Date of Patent: Nov. 28, 2006

(54) METHOD OF CONFIGURING A COMPUTER TO INCLUDE THE AVAILABLE OPTIONS OF A PRINTER

(75) Inventor: Jayasimha Nuggehalli, Union City, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/457,397

(22) Filed: Dec. 9, 1999

(51) Int. Cl.
G06F 15/177 (2006.01)

(52) U.S. Cl. ............... 709/221; 709/220; 709/222; 358/1.13; 358/1.14; 358/1.15; 358/1.16; 710/8; 710/16; 713/2; 713/100

(58) Field of Classification Search ........ 709/221; 358/1.14–1.15
See application file for complete search history.

(56) References Cited

U.S. PATENT DOCUMENTS

| | | | | |
|---|---|---|---|---|
| 5,467,434 A | * | 11/1995 | Hower et al. | 358/1.15 |
| 5,692,111 A | * | 11/1997 | Marbry et al. | 358/1.15 |
| 5,960,167 A | * | 9/1999 | Roberts et al. | 358/1.15 |
| 5,978,559 A | * | 11/1999 | Quinion | 358/1.15 |
| 5,982,996 A | * | 11/1999 | Snyders | 358/1.13 |
| 6,031,623 A | * | 2/2000 | Smith et al. | 358/1.14 |
| 6,184,998 B1 | * | 2/2001 | Tebeka | 358/1.13 |
| 6,195,171 B1 | * | 2/2001 | Ochiai | 358/1.13 |
| 6,219,151 B1 | * | 4/2001 | Manglapus et al. | 358/1.13 |
| 6,246,485 B1 | * | 6/2001 | Brown et al. | 358/1.13 |
| 6,266,693 B1 | * | 7/2001 | Onaga | 358/1.1 |
| 6,286,040 B1 | * | 9/2001 | Durham et al. | 709/221 |
| 6,301,012 B1 | * | 10/2001 | White et al. | 358/1.15 |
| 6,333,790 B1 | * | 12/2001 | Kageyama | 358/1.15 |
| 6,401,150 B1 | * | 6/2002 | Reilly | 358/1.1 |
| 6,424,424 B1 | * | 7/2002 | Lomas | 358/1.14 |

* cited by examiner

Primary Examiner—Syed A. Zia
(74) Attorney, Agent, or Firm—Oblon, Spivak, McClelland, Maier & Neustadt, P.C.

(57) ABSTRACT

A method of configuring a computer connected to a printer via a network by transmitting commands, such as SNMP commands, to the printer in order to retrieve the available options of the printer. In response to the transmitted commands, the printer transmits its available options to the computer, and the printer driver resident on the computer is then updated without manually selecting individual printer options to include the retrieved options. The present invention also provides a computer program product and corresponding GUI to configure a computer to include the available printer options. The GUI according to the present invention includes a plurality of pop-up menus having various display controls to operate the computer program, and is updated by the printer driver to reflect the available printer options.

43 Claims, 6 Drawing Sheets

METHOD OF CONFIGURING A COMPUTER TO INCLUDE THE AVAILABLE OPTIONS OF A PRINTER

BACKGROUND OF THE INVENTION

1. Field of the Invention

The present invention relates to a method of configuring a computer to include available options of a printer, and more particulary to a method of configuring a computer connected to the printer via a network to include the available printer options without having to manually reconfigure a printer driver. The present invention also relates to a computer program product and corresponding graphical user interface for configuring the computer to include the available printer options without having to manually select individual printer options.

2. Discussion of the Background

Figure 1:
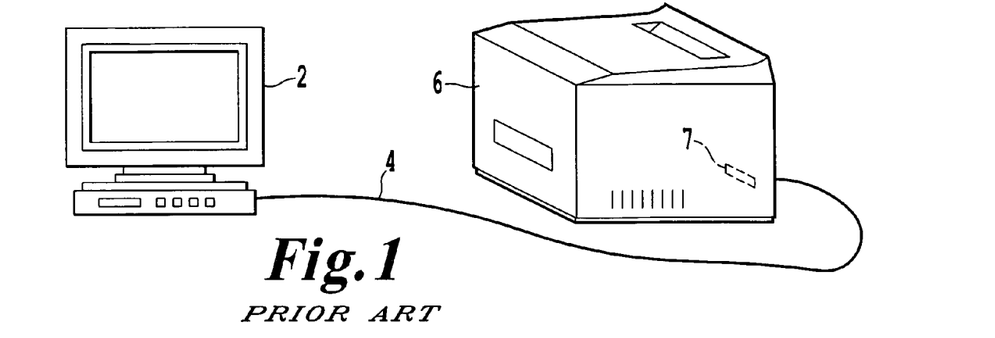
FIG. 1 illustrates a conventional computer connected to a printer.

Many personal computers used at the home or office are directly connected to a printer, i.e., a one-to-one connection. For example, FIG. 1 illustrates a conventional set-up of a computer 2 and a printer 6 attached via a cable 4. The printer 6 includes a connection port 7 for attaching the cable 4 to the printer 6. Thus, a user using the computer 2 can select an item or other object to be printed on the printer 6.

When the printer 6 is first installed at the home or office, a printer driver corresponding to the printer 6 is generally supplied on a separate computer readable medium, such as a CD-ROM, and a user must install the printer driver onto the computer 2. The user must also configure the computer 2 to include any available printer options supplied with the printer 6. This is generally accomplished by manually selecting options from a Graphic User Interface (GUI) provided with the printer driver. For example, the GUI may list printer options, such as input trays, output trays, memory available, stapling devices, etc. A base model of the printer generally includes only standard printer options (e.g., one input tray, one output tray, and no extra memory). Thus, the user is required to purchase any desired additional options, such as extra input or output trays.

When the printer driver is loaded onto the computer, the corresponding GUI prompts the user for any additional printer options he or she may have purchased. Then, the user manually selects the additional printer options from the list of options displayed on the GUI. Alternatively, the user may retrieve the available printer options by connecting the printer 6 to a local printer port of the computer 2 and then query a language monitor which enables bidirectional communication between the printer 6 and the computer 2. A language monitor is a software module which uses, for example, page-description language, such as Postscript, PJL, etc., to retrieve the available printer options.

Figure 2:
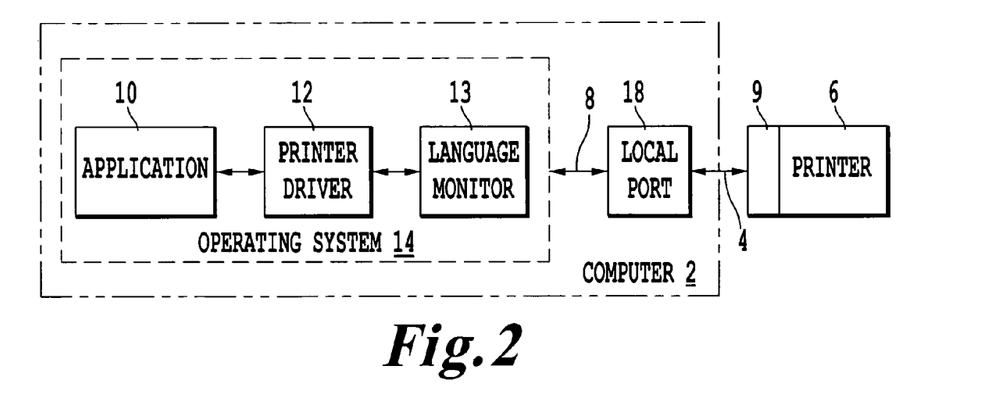
FIG. 2 is a block diagram illustrating functional components and data passed between a software application and a printer.

FIG. 2 illustrates a block diagram of a conventional application 10 interfacing the printer 6. The conventional application 10 is hosted on an operating system 14 resident on the computer 2. A user may retrieve the options available with the printer 6 using the application 10, a printer driver 12 and a language monitor 13. The printer driver 12 and language monitor 13 are printer and operating system specific software interfaces. The operating system 14 sends signals in accordance with instructions from the printer driver 12 and language monitor 13 to the local port 18 via a connection 8, thus placing signals corresponding the printer driver 12 and language monitor 13 on the cable 4 connected to a parallel port 9 of the printer 6. That is, via the application 10 and printer driver 12, the the printer driver 12 may query the language monitor 13 for the available printer options, and the language monitor 13 will retrieve this information from the printer 6 via the local port 18 and cable 4. The printer driver 12 then updates the list of available printer options displayed on the GUI. However, the printer 6 must be connected to the local port of the computer 2 to retrieve the available printer options using the language monitor 13.

Figure 3:
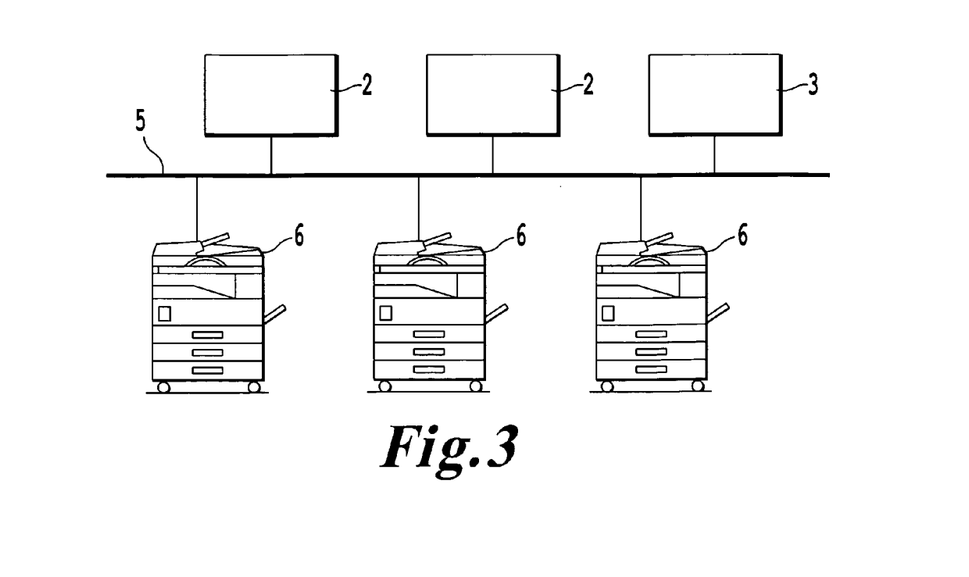
FIG. 3 illustrates a plurality of computers connected to a plurality of printers via a network.

Increasingly, a plurality of printers and computers are connected to a network, such as a Local Area Network (LAN). For example, FIG. 3 illustrates a plurality of computers 2 and printers 6 connected to each other via a network 5. The computers 2 and printers 6 illustrated in FIG. 3 are identified by the same reference numeral, however, the network may include many different computers and printers connected together. Also shown is a centralized computer 3, used by a system administrator, for example. The centralized computer 3 generally includes a network manager and/or a printer manager, such as an IBM Network Printer Manager sold under the trademark NPM, or a Hewlett Packard (HP) printer administrator sold under the trademark HP JET ADMIN. The printer manager is used by the system administrator of the network 5 to control, modify, monitor, etc., the plurality of printers 6 connected to the network 5.

In addition, the printers 6 and/or computers 2 connected via the network 5 may be added or removed on a regular basis. Thus, when a new printer is added, for example, the computer(s) 2 using that printer have to be reconfigured to use the new printer. To accomplish this, the system administrator first installs a printer driver (corresponding to the newly added printer) on the computer(s). Then, using HP JETADMIN on the centralized computer 3, for example, the system administrator manually views the available options for that printer. This is a time consuming and tedious process, because the system administrator must know beforehand what printer options are available with the particular printer (i.e., by looking at the printer or reading a user's manual, for example). Further, the end user of the computer does not generally have access to HP JETADMIN, for example, on their computer, and thus is unable to configure his or her printer without support from the system administrator. Therefore, the user must wait for an available system administrator.

SUMMARY OF THE INVENTION

Accordingly, one object of this invention is to solve the above-noted and other problems.

Another object of the present invention is to provide a method of configuring a computer to include the available options of a printer connected to the computer without manually selecting individual printer options.

Yet another object of the present invention is to provide a computer program product, which retrieves available options from a printer connected to a network using, for example, Simple Network Management Protocol (SNMP) commands.

Another object of the present invention is to provide a private extension to a standard SNMP Management Information Base (MIB) to retrieve available options from the printer connected to the network.

Still another object of the present invention is to provide a graphic user interface to assist a user in operating the computer program product.

To achieve these and other objects, the present invention provides a method of configuring a computer connected to a printer via a network by transmitting commands, such as SNMP commands, to the printer in order to retrieve the available options of the printer. In response to the transmitted commands, the printer transmits its available options to the computer, and the printer driver resident on the computer is then updated, without manually selecting individual printer options, to include the retrieved options. The present invention also provides a computer program product and corresponding GUI to configure a computer to include the available printer options. The GUI according to the present invention includes a plurality of pop-up menus having various display controls to operate the computer program, and is updated by the printer driver to reflect the available printer options.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 4:
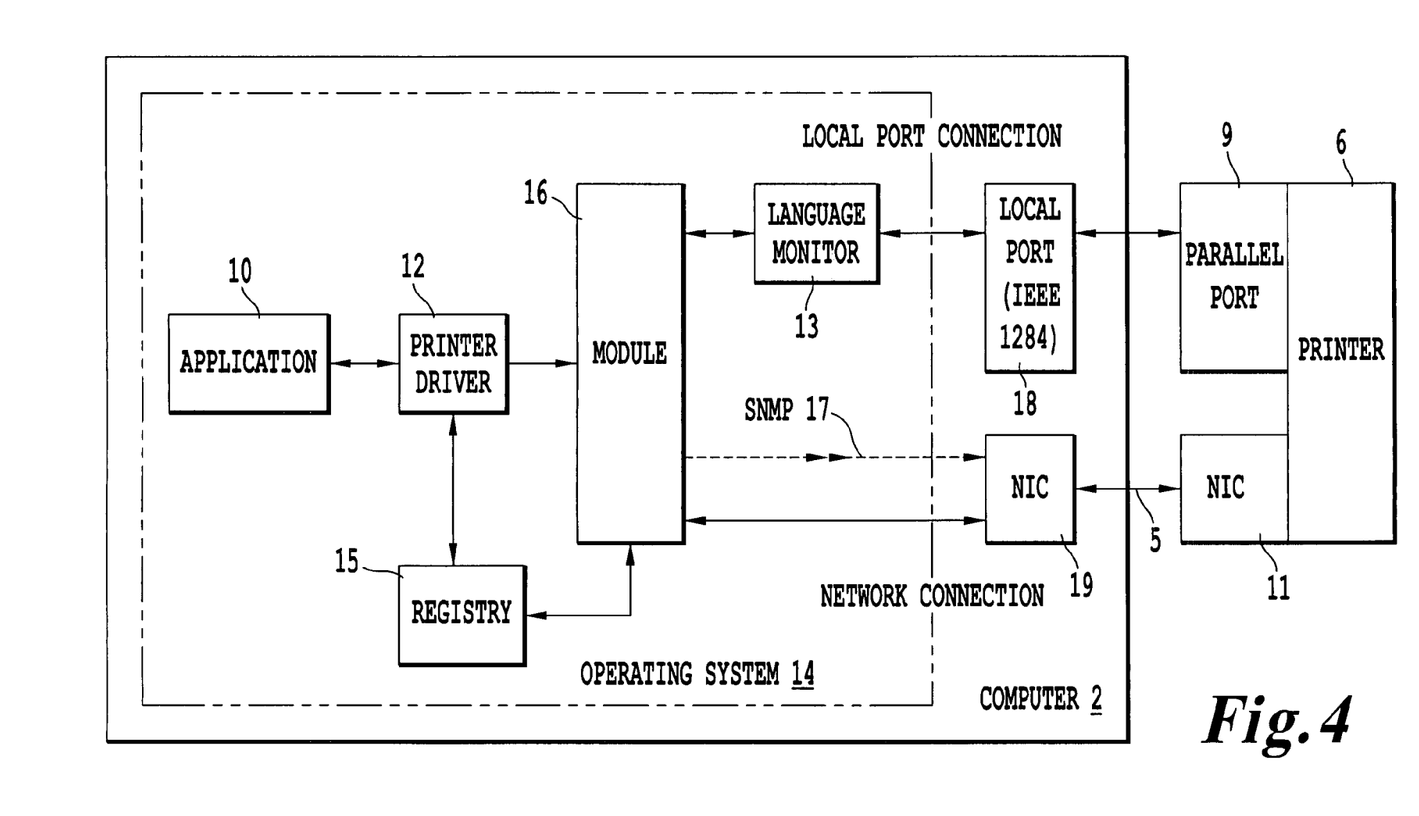
FIG. 4 is a block diagram illustrating functional components and data passed between a software application and a printer according to the present invention.

Referring now to the drawings, wherein like reference numerals designate identical or corresponding parts throughout the several views, FIG. 4 is a block diagram illustrating the functional components and data passed between a software application 10 and a printer 6 according to the present invention. One difference between the block diagram shown in FIG. 4 and that shown in FIG. 2 is a module 16. The module 16 is an executable program and corresponds to the printer driver 12. The module 16 may be loaded onto the computer 2 via a computer storage medium, such as a CD-ROM, tape, disk or memory chip/card, or the Internet (i.e., by downloading the module 16). FIG. 4 also illustrates SNMP commands 17 used by to module 16 to retrieve the available printer options provided with the printer, and a registry 15, which is a system specific database in which computer/printer information is stored. The module 16 executes SNMP commands 17 to retrieve printer information from the printer 6 via a network interface card (NIC) 19 of the computer 2, the network 5 and the NIC 11 of the printer 6. This retrieved information is then used to update the internal data structures of the printer driver (for example, by using standard library functions provided with a programming language), and is stored in the registry 15. The present invention is not limited to SNMP, and other network protocols may be used. However, for simplicity purposes, the present invention will be described with reference to SNMP. In addition, FIG. 4 illustrates the computer 2 connected to the printer 6 via the parallel port 9 and network 5. However, in practice, only one type of connection is used.

The term Simple Network Management Protocol (SNMP) refers to a collection of specifications for network management that includes the SNMP protocol itself, the definition of a data base, and associated concepts. The "basic" SNMP is now in wide spread use. Virtually all major venders of host computers, workstations, bridges, routers, and hubs offer basic SNMP. SNMP gives a network manager or user the ability to monitor subnetworks as a whole rather than just individual devices on the subnetwork. In addition, SNMP defines a Management Information Base (MIB), which is a database containing information about the elements to be managed. Each resource to be managed is represented by an object in the MIB. The MIB is a structured collection of such objects. Each node in the network may maintain a MIB that reflects the status of the managed resources at that node. A network-management entity may monitor their resources at that node by reading the values of objects in the MIB and may control the resources of that node by modifying those values. The Structure of Management Information (SMI), which defines a general framework in which a MIB can be defined and constructed, identifies the data types that can be used in the MIB and how resources within the MIB are represented and named. The philosophy behind SMI is to encourage simplicity and sensibility within the MIB. Thus, the MIB may store only simple data types: scalars and two-dimensional scalar arrays. In addition, the "basic" MIB may include private extensions (i.e., user developed extensions). The present invention includes such a private extension.

One example of a private MIB item, according to the present invention, is shown below in Table 1. This is a private extension to the MIB, and is used to retrieve information about various options available with a printer. This MIB item supports several printer models sold by Ricoh Corporation, Ltd., such as the Adonis-P, PomeloWIN, Russian, StingerC, and StingerP3R&L II printer models. These printer models are used for illustration purposes only and other models manufactured by different companies may be used. Thus, when the host computer sends this MIB item to the printer (i.e., via a GetRequest SNMP command), the printer returns an integer value, such as "37" which indicates the StingerC printer includes a Bank 1 (see Table 1).

In more detail, SNMP provides Protocol Data Units (PDUs), which are essentially commands that may be transmitted to a device (e.g., a printer) to request information. One such PDU is the GetRequest ($p_1, p_2, p_3, \ldots$) PDU. The parameters $p_1$, $p_2$, $p_3$, etc., include, for example, an object name, object identifier (ODI) and a target address (i.e., the address of the printer, for example). Thus, referring to Table 1, the module 16 may execute a GetRequest (RicohEngOptionIdentifyNumber, 1.3.6.1.4.1.367.3.2.1.2.4, 80.3.2.1) to the printer 6. The parameters $p_1$, $p_2$ and $p_3$ in this GetRequest PDU respectfully correspond to the object name of the MIB item, the object identifier and the target address of the printer 6. Then, a Network Interface Card (NIC) 11 (see FIG. 4) on the printer 6 returns a value of "37" (as an example), which indicates the printer 6 includes a Bank1. A Bank1 is system specific and means the printer includes an additional input tray (i.e., for a total of two input trays). A Bank2 (integer value "36") means the printer 6 has two additional input trays. The NIC 11 maintains the additional options installed on the printer, because when the printer's power is first turned on, the NIC 11 is updated with all installed printer options.

Another SNMP PDU is the GetNextRequest ($p_1$, $p_2$, $p_3$) PDU, which is almost identical to the GetRequest ($p_1$, $p_2$, $p_3$) PDU. The GetNextRequest ($p_1$, $p_2$, $p_3$) PDU may be executed by the module 16 to retrieve additional printer options. For example, assume the module 16 executes the GetNextRequest command, and the NIC 11 of the printer 6 returns an integer value of "47." This means the printer 6 includes an additional Hard Disk Drive (HDD)—(See the second to last line in Table 1).

Further details of the SNMP MIB and other SNMP concepts may be found in the book: William Stallings, *SNMP, SNMPv2, and CMIP: The Practical guide to Network-Management Standards* (Addison-Wesley Publishing Company, 1993), which is incorporated herein in its entirety.

TABLE 1

PRIVATE MIB ITEM

```
RicohEngOptionIdentifyNumber
STATUS current
DESCRIPTION
    "ricohEngOptionIdentifyNumber convention"
SYNTAX INTEGER {
    -- Reserved for general use from 0 to 9.
    other(0),
    unknown(1),
    -- Defined for each product options from 10.
    adonisPFinisher3000X(10), -- for Adonis-P
    adonisPPrintPost(11),
    adonisPMsu(12),
    adonisPBank(13),
    adonisPLCIT(14),
    adonisPOutTray(15),
    adonisPDuplex(16),
    adonisPHDD(17),
    pomeloWinOptionTray(18), -- for PomeloWIN
    fresaWinOptionTray(19), -- for FresaWIN
    winAColoradoB(20), -- for WinA
    winASeine(21),
    winARheinB(22),
    winADuplex(23),
    winABank3(24),
    winABank2(25),
    russianFinisher1000(26), -- for Russian
    russianMsu(27),
    russianBank1(28),
    russianBank2(29),
    russianLCIT(30),
    russianMultiBypassTray(31),
    russian1BinOutTray(32),
    russian4BinOutTray(33),
    russianDuplex(34),
    russianHDD(35),
    russianShiftOutUnit(36),
    stingerCBank1(37), -- for StingerC
    stingerCBank2(38),
    stingerC1BinOutTray(39),
    stingerP3R2Bank1(40), -- for StingerP3R&LII
    stingerP3R2Bank2(41),
    stingerP3R2HDD(42),
    stingerP3L2Bank1(43),
    stingerP3L2Bank2(44),
    stingerCMSU(45), -- for StingerC(added)
    stingerCMultiBypassTray(46),
    stingerCHDD(47)
}
```

Thus, referring again to FIG. 4, the module 16 retrieves available printer options from the printer 6 connected to the computer 2 via the network 5 using SNMP commands. The printer driver 12 is then updated to include the retrieved printer options by using windows registry API, by reading options which are stored in the registry 15. The printer driver 12 also updates a GUI to reflect the retrieved printer options. The GUI is discussed in more detail later. The printer driver 12 may be informed about the updated registry 15 by, for example, the module 16 toggling a value in the registry between a "0" or "1". That is, a value of "0" may mean the registry 15 has not been updated and a value "1" may mean the registry 15 has been updated. The printer driver 12 may then monitor the status of this value. The module 16 and the operation of the same will now be explained in more detail.

Figure 5A:
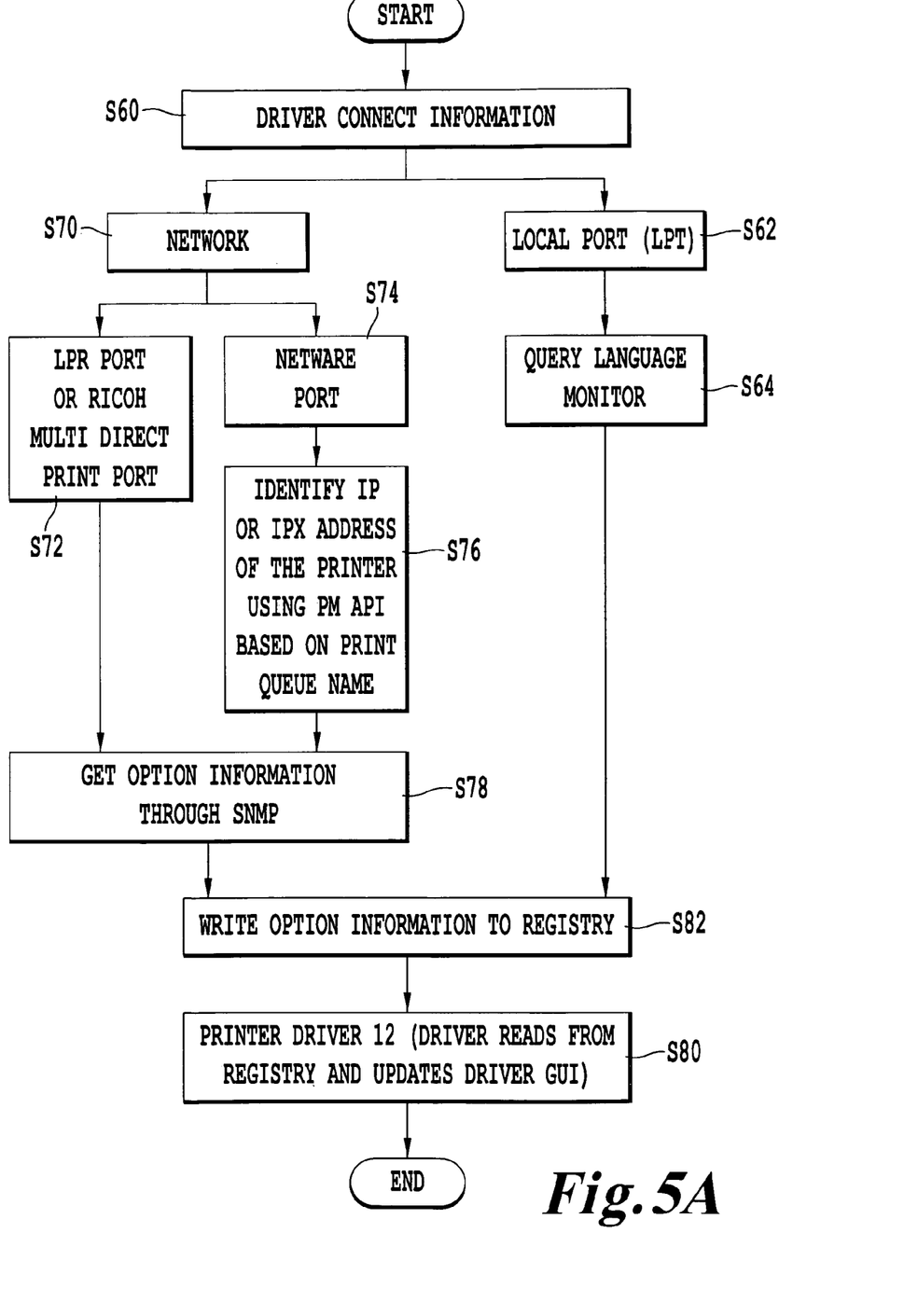
FIG. 5A is a flow chart illustrating the steps performed by a computer program product according to the present invention.
Figure 6A:
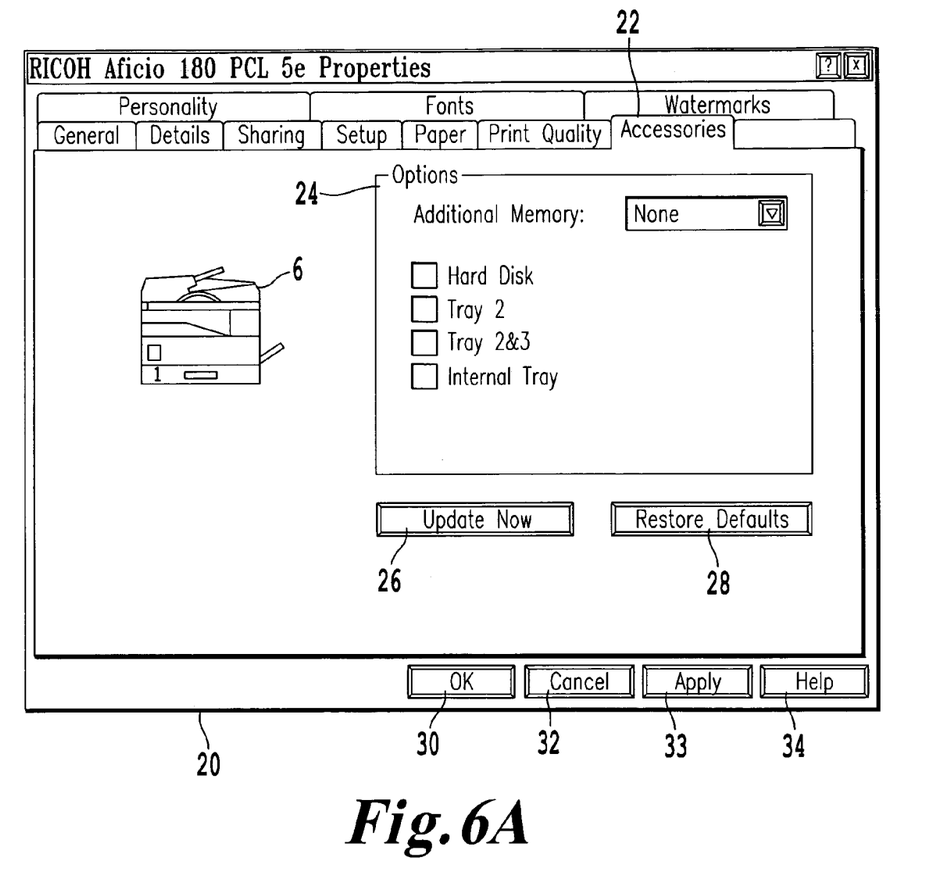
FIG. 6A is a printer properties dialog according to the present invention.

FIG. 5A is a flow chart illustrating the steps performed by the module 16 of the present invention and the printer driver 12. In particular, the module 16 first determines whether the computer 2 is connected to the printer 6 via a network port connection or a local port connection (step S60). This information is stored in the registry 15 and may be accessed by standard library functions included with a windows Application Program Interface (API). It is assumed the type of connection (i.e., local port or network port) is previously set, for example, by a user selecting a plurality of menu options provided with a windows environment, such as a Windows 95 operating system. One example of how to set the type of connection will now be given with reference to the Windows 95 operating system. Other operating systems and window environments will vary. First, the user selects a "Start" push button from a menu bar on the display of the computer 2, and then the user highlights the "Settings" display region on a pop-up menu which is activated when the "Start" push button is selected. The user then selects the "Printers" display region from the pop-up menu which is activated when the "Settings" display region is highlighted. When the user selects the "Printers" display region, a pop-up menu is displayed listing a plurality of printers and/or facsimiles, etc., which are connected to the computer 2. Then, the user highlights a desired printer from the plurality of printers displayed, and clicks the right mouse button, which pops-up a menu allowing the user to select a "Properties" display region. The user then selects the "Properties" display region and a printer properties dialog, such as that shown in FIG. 6A is popped up on the display. When the printer properties dialog is displayed, the user selects the "Details" tab from this dialog (Note, the printer properties dialog in FIG. 6A displays an "Accessories" tab and not the "Details" tab). When the "Details" tab is selected, the user is then prompted to enter the type of connection information (i.e., a network port or a local port). When this information is input, the user selects an "Apply" push button and then an "Okay" push button. The registry 15 is then updated with the connection information. Thus, the module 16 may determine whether the computer 2 is connected to the printer 6 via a network connection or local port connection by reading this information from the registry 15 with a standard library function included with the windows API.

Returning back to FIG. 5A, if it is determined that the computer 2 is connected to the printer 6 via a local port (Step S62), the printer driver 12 queries the language monitor 13 so as to retrieve the available printer options from the printer 6. The printer driver 12 queries the language monitor 13 by executing a call function included in, for example, a C/C++ programming language. The language monitor 13 then executes page-description language, such as Postscript or PJL to the printer 6 in order to retrieve the printer options. The retrieved printer options are then stored in the registry 15 (step S82). This retrieved information is then used to update the internal data structures of the printer driver 12 and the GUI is also updated to reflect the available printer options (Step S80).

If it is determined that the computer 2 is connected to the printer 6 via the network port (Step S70), the module 16 then determines what type of network port the computer 2 is connected to. That is, the computer 2 may be connected to the printer 6 through several different network ports, such as a Line Printer Remote (LPR) port, RICOH multidirect print port, or a Novell Netware port (Step S74). The computer 2 may be connected to the printer 6 via other network ports, and those shown in FIG. 5 are used merely for illustration purposes only. The primary differences between the LPR port/Ricoh MultiDirect Print port shown in step S72 and the Netware Port shown in step S74 is that the LPR/Ricoh MultiDirect Print port is an Ethernet based connection and the address of the printer is known (i.e., preset), whereas for the Netware port connection, the address of the printer is not known (i.e., only the printer queue name is known).

If the computer 2 is connected to the printer 6 via an LPR/Ricoh MultiDirect Print port (step S72), the module 16 retrieves the printer options via, for example, SNMP commands 17 as discussed previously. That is, the address of the printer is known and may be included with the SNMP GetRequest PDU (i.e., the target address parameter $p_3$). This retrieved information is then used to update the internal data structures of the printer driver 12 and the corresponding GUI is also updated to reflect the available printer options (Step S80). When the Apply push button 33 is selected, the retrieved printer options are stored in the registry 15 (Step S82).

If it is determined that the computer 2 is connected to the printer 6 via the Netware port (Step S74), the module 16 identifies the IP or IPX address of the printer 6 by mapping the printer queue name to the IP/IPX address of the printer. The IPX address is used in the Novell Internet Package Exchange System and includes a network number and a node number expressed in a format: "network.node." The network number identifies a physical network, and is a 4-byte (32-bit) quantity that must be unique throughout the entire IPX network. The network number is expressed as hexadecimal digits. The maximum number of digits allowed is 8. The node number identifies a node on the network, and is a 48-bit quantity, represented by dotted triplets of four-digit hexadecimal numbers. The node number is usually the hardware address of the interface card, and must be unique inside the particular IPX network. The following is an example of an IPX network address: "4a.0000.0c00.23fe." In this example, the network number is 4a (more specifically, it is 0000004a), and the node number is 0000.0c00.23fe. All digits in the address are hexadecimal. The IP address is an Internet address (i.e., TCP/IP Internet), and is assigned a unique 32-byte Internet address value. For example, an example of an IP address is "130.15.4.1" which is displayed in dotted-decimal notation. A more detailed description of IPX and IP addresses may be found in the book: James Martin, *Local Area Networks Architectures and Implementations* (Prentice Hall, 2ed. 1994), which is incorporated herein by reference in its entirety.

A description of how the module 16 determines the IP or IPX address will be discussed later with reference to FIG. 5B. Once the IP or IPX address is determined, the module 16 retrieves the printer options from the printer 6 via SNMP commands 17. The retrieved information is then stored in the registry 15 of the computer 2 (Step S80). The printer driver 12 is then updated to include the retrieved printer options, and the corresponding GUI is updated to reflect the available printer options (Step S82).

Figure 5B:
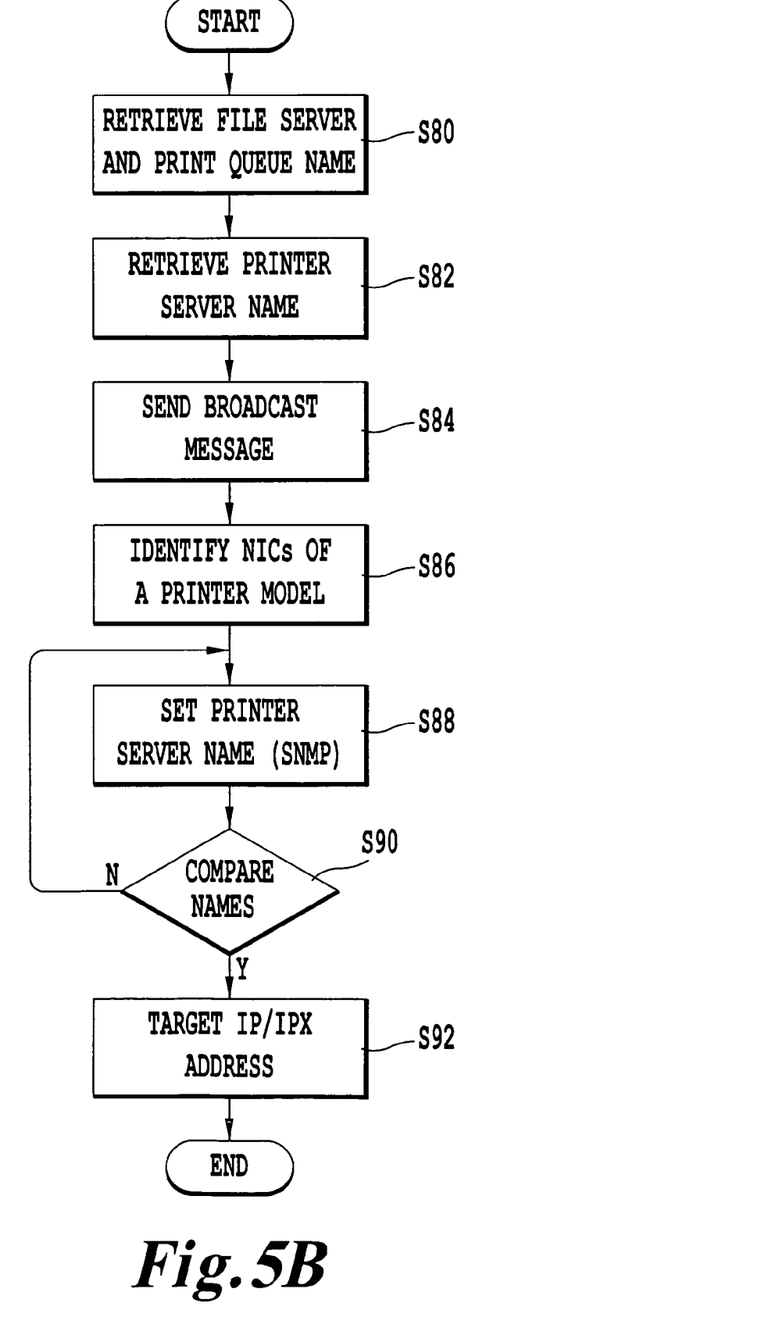
FIG. 5B is a flow chart illustrating the steps performed by the computer program product to retrieve an IP/IPX address of a printer according to the present invention.

Turning now to FIG. 5B, which illustrates one example of how the module 16 determines the IP or IPX address of the printer 6. First, the printer driver has information about the file server and printer queue name based on the user selected port information (which is set as previously discussed). For example, the printer may be connected to the port "\\Forte\Aficio180" where "Forte" is the file server name and "Aficio180" is the queue name. This information may be obtained with a windows API based on the known printer driver name (Step S80). Then, using a Novell Netware API, a "printer server" name associated with the above-noted file server and queue name may be obtained (Step S82). In addition, via a Ricoh Peripheral Manager API, for example, a broadcast message is sent throughout the network to obtain all the available printers on the network (Step S84). In response to this broadcast message, the NIC 11 of each printer sends back to the module 16 the respective IP/IPX address of the printer and the respective MAC address of the NIC 11. Based on this information, the module 16 identifies and isolates the printers corresponding to a particular model, such as a Ricoh StingerC model (Step S86). The model name may be determined from the MAC address of the NIC. That is, the MAC address of the printer includes a hexadecimal digit which corresponds to a particular printer model. Step S86 is performed to narrow down the search of the target IP/IPX address of the printer on the network. In Step S88, the module 16 sends an SNMP MIB object to each printer to obtain a printer server name associated with each NIC obtained in Step S86. The SNMP MIB object is a private MIB item similar to that discussed previously, and may be used to retrieve information about the printer server name. The SNMP private MIB item is initialized during the setup of the NIC. In Step S90, the module 16 compares the printer server name obtained in Step S86 with the printer server name obtained by the Netware API in Step S82 to find the target address of the printer. If the comparison between the printer server names match (YES in Step S90), the target IP/IPX address has been found. If the comparison does not match (NO in Step S90), the next NIC found in Step S86 is compared. This process is reiterated until the module 16 locates the target IP/IPX address of the printer 6.

Figure 6B:
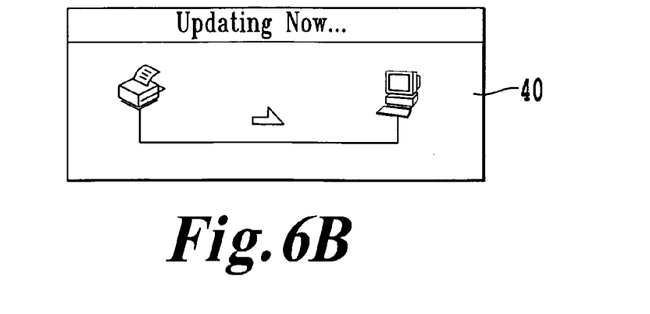
FIG. 6B is a child dialog of the printer properties dialog shown in FIG. 6A.
Figure 6C:
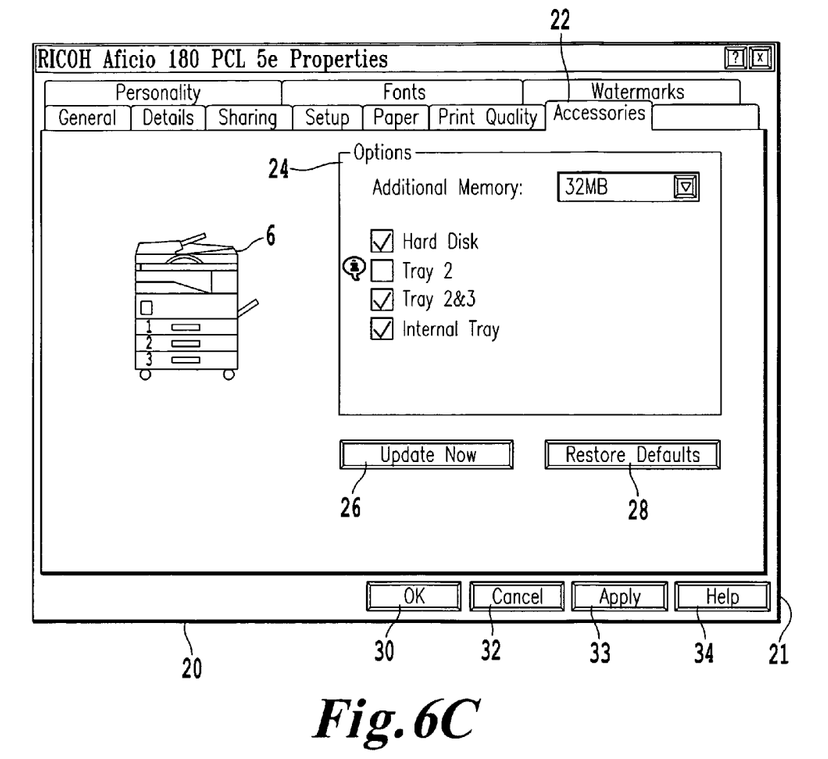
FIG. 6C is an updated printer properties dialog according to the present invention.

Turning now a description of a GUI included with the printer driver 12 by referring to FIGS. 6A, 6B and 6C. FIG. 6A illustrates a printer properties dialog 20 which includes an Accessories tab 22. The Accessories tab 22 includes an "Options" display region 24, "Update Now" push button 26, "Restore Defaults" push button 28, "OK" push button 30, "Cancel" push button 32, "Apply" push button 33, and "Help" push button 34. The printer properties dialog 20 may be popped on a display of the computer 2 in a known manner as discussed above (i.e., by selecting the "Start" push button, etc., displayed in the main menu bar on the computer 2). Then, the user may select the Accessories tab 22 provided by the present invention.

The printer properties dialog 20 shown in FIG. 6A illustrates a base printer model 6. That is, the printer 6 is a base model which does not include any additional options (note the Options display region indicates there are no additional options selected). The printers properties dialog 20 is thus displayed when a user has not configured the computer to include any additional printer options.

The user may configure the computer 2 to include the available printer options by selecting the Update Now push button 26. When the Update Now push button 26 is selected, the module 16 and printer driver 12 perform the steps illustrated in the flowchart of FIG. 5A as discussed above. Because this process may take a few seconds, an Updating Now dialog 40 (see FIG. 6B) is popped up on the display indicating to the user that the update process is occurring. The Updating Now dialog 40 may be popped up on the display by setting a callback to the Update Now push button 26. That is, when the Update Now push button 26 is selected, a callback routine pops up the Updating Now dialog 40. When the module 16 writes the printer options to the registry, the printer driver reads these options from the registry and updates the Options display region 24.

FIG. 6C is a printer properties dialog 21 illustrating what happens when the user selects the Update Now push button 26 shown in FIG. 6A. As shown, the Options display region 24 has been updated to include a Hard Disk, Tray 2 & 3, Internal Tray, and an Additional Memory of 32 MB. The printer 6 displayed in the printer properties dialog 21 is also updated to include the additional options (note the printer 6 displayed in FIG. 6A is the base model and does not include any additional options). Thus, by the user selecting the Update Now push button 26, the available options of the printer 6 are shown in the Options display region 24. The Apply push button 33 may be selected after the available options of the printer 6 are shown, which will apply the additional options. The OK push button 30 closes the printer properties dialog 21. The Cancel push button 32 cancels any information or options selected by the user. The Help push button 34 pops up general help information corresponding to the Accessories tab 22 and/or corresponding Printer properties dialogs. That is, when the Help push button 34 is selected, a text file containing predetermined help text is popped up.

If the user wishes to restore the original default values (i.e., no extra options as illustrated in FIG. 6A), the user may select the Restore Defaults push button 28. At this time, the items in the option display region 24 will be cleared (the registry 15 is also updated accordingly). The printer driver 12 is responsible for restoring the default values.

As discussed above, the module 16 is an executable program. The executable program may be developed using any suitable programming language, such as C, C++, Fortran, etc.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits whereby interconnecting an appropriate network of conventional computer circuits, as will be readily apparent to those skilled in the art.

Any portion of the present invention implemented on a general purpose digital computer or microprocessor includes a computer program product which is a storage medium including instructions which can be used to program a computer to perform a process of the invention. The storage medium can include, but is not limited to, any type of disk including floppy disks, optical disks, CD-ROMs and magneto-optical disks, ROMs, RAMs, EPROMs, EEPROMs, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

The invention claimed is:

1. A graphical user interface for assisting a distributed end user in configuring a computer connected to a printer and to a printer server via a network, the printer being configured to directly communicate with the computer according to a network protocol, and the printer server being configured to control the printer, comprising:
   a parent window including,
      a first display control configured to display a resemblance of the printer,
      a second display control configured to display at least one printer option associated with the printer, and
      a third display control configured to activate a computer program product resident on the computer, the computer program product causing the computer to transmit commands over the network according to the network protocol, bypassing the printer server, to the printer to retrieve the at least one printer option, wherein the computer transmits Simple Network Management Protocol (SNMP) commands to the printer to retrieve the at least one printer option, and
   configured to selectively update a printer driver resident on the computer to include the at least one printer option, wherein,
   the first and second display controls are graphically updated to reflect the at least one printer option retrieved by the computer program product to notify the distributed end user of the computer about the at least one printer option, and
   the first display control is updated from an initial representation of a base printer having a base set of printer options to a current representation of the printer having the at least one printer option.

2. The graphical user interface according to claim 1, further comprising:
   a child window configured to indicate a status of retrieving the at least one printer option, the child window being displayed when the third display control is selected.

3. The graphical user interface according to claim 1, further comprising:
   a fourth display control configured to restore default options of the printer.

4. The graphical user interface according to claim 1, wherein the graphical user interface is included with a printer properties dialog.

5. The graphical user interface according to claim 1, wherein the at least one printer option includes at least one of 1) an additional memory, 2) an additional input tray, 3) an additional output tray, 4) a hard disk, 5) an internal tray, 6) a finisher, 7) a stapling unit, 8) a punch unit and 9) a booklet finisher.

6. A method for obtaining printer options in a network including a computer, a printer configured to directly communicate with the computer according to a network protocol, and a printer server configured to control the printer, comprising:
   providing the computer with a computer program product configured to cause the computer to directly communicate with the printer via the network according to the network protocol;
   transmitting a command from the computer to the printer via the network to retrieve at least one printer option from the printer, the command bypassing the printer server, wherein transmitting the command includes transmitting Simple Network Management Protocol (SNMP) commands to the printer to retrieve the at least one printer option;

transmitting the at least one printer option from the printer to the computer via the network while bypassing the printer server; and updating a printer driver resident on the computer to include the at least one printer option.

7. The method according to claim 6, further comprising:
determining that the printer is connected to the computer via a network port.

8. The method according to claim 7, further comprising:
determining whether the printer is connected to the computer via one of 1) an LPR/Ricoh Multidirect port and 2) a Netware port after determining that the printer is connected to the computer via the network port.

9. The method according to claim 8, further comprising:
identifying an address of the printer after determining that the printer is connected to the computer via the Netware port.

10. The method according to claim 9, wherein identifying the address of the printer includes mapping a name of the printer server to the address of the printer.

11. The method according to claim 6, further comprising:
storing the at least one printer option in a storage medium of the computer, the storage medium including a registry.

12. The method according to claim 6, further comprising:
downloading the computer program product from the Internet.

13. The method according to claim 6, further comprising:
installing a SNMP Management Information Base (MIB) extension on a Network Interface Card (NIC) of the printer, wherein the MIB extension includes scalar values respectively corresponding to the at least one printer option.

14. The method according to claim 13, further comprising:
transmitting, by the NIC of the printer, a first scalar value respectively corresponding to a first available printer option in response to a SNMP GetRequest command transmitted by the computer.

15. The method according to claim 14, further comprising:
transmitting, by the NIC of the printer, a second scalar value respectively corresponding to a second available printer option in response to a SNMP GetNextRequest command transmitted by the computer.

16. The method according to claim 6, wherein the network connects the computer to a plurality of other computers and to the printer server.

17. The method of claim 6, further comprising:
executing the computer program product via a graphic user interface; and
updating a display control to graphically represent the at least one printer option.

18. The method of claim 17, wherein updating the display control includes changing the display control from an initial representation of a first printer having a first set of printer options to a current representation of the printer having the at least one printer option.

19. A network system comprising:
a computer;
a printer coupled to the computer via a network; and
a printer server coupled to the computer and to the printer via the network and configured to control the printer,
the computer including, means for causing the computer to directly communicate with the printer via the network according to a network protocol, means for transmitting a command, bypassing the printer server, to the printer via the network to retrieve at least one printer option from the printer, wherein the means for transmitting transmits Simple Network Management Protocol (SNMP) commands to the printer to retrieve the at least one printer option, and means for updating a printer driver resident on the computer to include the at least one printer option, and the printer including, means for directly communicating with the computer according to the network protocol, and means for transmitting the at least one printer option to the computer via the network while bypassing the printer server.

20. The system according to claim 19, further comprising:
means for determining that the printer is connected to the computer via a network port.

21. The system according to claim 20, further comprising:
means for determining whether the printer is connected to the computer via one of 1) an LPR port and 2) a Netware port when the printer is connected to the computer via the network port.

22. The system according to claim 21, further comprising:
means for identifying an address of the printer when the printer is connected to the computer via the Netware port.

23. The system according to claim 22, wherein the means for identifying identifies the address of the printer by mapping a name of the printer server to the address of the printer.

24. The system according to claim 19, further comprising:
a storage medium provided at the computer, configured to store the at least one printer option, and including a registry.

25. The system according to claim 19, further comprising:
means for downloading the means for causing from the Internet.

26. The system according to claim 19, further comprising:
means for installing a SNMP Management Information Base (MIB) extension on a Network Interface Card (NIC) of the printer, wherein the MIB extension includes scalar values respectively corresponding to the at least one printer option,
wherein the means for directly responding includes the NIC of the printer.

27. The system according to claim 26, further comprising:
means for transmitting, by the NIC of the printer, a first scalar value respectively corresponding to a first available printer option in response to a SNMP GetRequest command transmitted by the means for transmitting.

28. The system according to claim 27, further comprising:
means for transmitting, by the NIC of the printer, a second scalar value respectively corresponding to a second available printer option in response to a SNMP GetNextRequest command transmitted by the means for transmitting.

29. The system according to claim 19, wherein the network connects the printer to a plurality of other computers and to the printer server.

30. The system of claim 19, further comprising:
a graphic user interface resident on the computer and configured to allow a user to activate the means for causing; and a display provided at the computer and configured to display a graphical representation of the at least one printer option.

31. The system of claim 30, further comprising:

means for controlling the display to change the graphical representation from an initial representation of a first printer having a first set of printer options to a current representation of the printer having the at least one printer option.

32. A computer program product comprising a computer usable medium having computer readable program code embodied in the computer usable medium that, when executed, causes a computer to:

transmit a command according to a network protocol to a printer via a network to retrieve at least one printer option from the printer, the command bypassing a printer server coupled to the printer and to the computer via the network, wherein said computer readable program code, when executed further causes said computer to transmit Simple Network Management Protocol (SNMP) commands to the printer to retrieve the available printer options;

receive the at least one printer option directly from the printer via the network according to the network protocol, the printer being configured to directly communicate with the computer according to the network protocol; and update a printer driver resident on the computer to include the at least one printer option.

33. The computer program product according to claim 32, wherein said computer readable program code, when executed, further causes said computer to:

determine that the printer is connected to the computer via a network port.

34. The computer program product according to claim 33, wherein said computer readable program code, when executed, further causes said computer to:

determine whether the printer is connected to the computer via one of 1) an LPR port and 2) a Netware port when the printer is connected to the computer via the network port.

35. The computer program product according to claim 34, wherein said computer readable program code, when executed, further causes said computer to:

identify an address of the printer when the printer is connected to the computer via the Netware port.

36. The computer program product according to claim 35, wherein said computer readable program code, when executed, further causes said computer to:

identify the address of the printer by mapping a name of the printer server to the address of the printer.

37. The computer program product according to claim 32, wherein said computer readable program code, when executed, further causes said computer to:

store the at least one printer option in a storage medium of the computer, the storage medium including a registry.

38. The computer program product according to claim 32, wherein the computer program product is downloaded from the Internet.

39. The computer program product according to claim 32, wherein a SNMP Management Information Base (MIB) extension is resident on a Network Interface Card (NIC) of the printer, and the MIB extension includes scalar values respectively corresponding to the at least one printer option.

40. The computer program product according to claim 39, wherein the NIC of the printer transmits a first scalar value respectively corresponding to a first available printer option in response to a SNMP GetRequest command transmitted by the computer.

41. The computer program product according to claim 40, wherein the NIC of the printer transmits a second scalar value respectively corresponding to a second available printer option in response to a SNMP GetNextRequest command transmitted by the computer.

42. The computer program product of claim 32, wherein said computer readable program code, when executed, further causes said computer to:

control a display of the computer to display a graphical representation of the at least one printing option.

43. The computer program product of claim 42, wherein said computer readable program code, when executed, further causes said computer to:

control the display to change the graphical representation from an initial representation of a first printing device having a first set of printing options to a current representation of the printing device having the at least one printer option.

* * * * *